US008193981B1

(12) United States Patent
Hwang et al.

(10) Patent No.: US 8,193,981 B1
(45) Date of Patent: Jun. 5, 2012

(54) COORDINATED SENSING AND PRECISION GEOLOCATION OF TARGET EMITTER

(75) Inventors: Patrick Y. Hwang, Cedar Rapids, IA (US); Gary A. McGraw, Cedar Rapids, IA (US); Robert J. Frank, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 756 days.

(21) Appl. No.: 12/284,937

(22) Filed: Sep. 26, 2008

(51) Int. Cl.
*G01S 19/24* (2010.01)
(52) U.S. Cl. .................................. 342/357.63
(58) Field of Classification Search ... 342/357.2–357.78
See application file for complete search history.

(56) References Cited

U.S. PATENT DOCUMENTS 5,936,571 A * 8/1999 Desjardins ............... 342/357.59
6,407,703 B1 * 6/2002 Minter et al. .............. 342/450
6,407,704 B1 * 6/2002 Franey et al. .......... 343/700 MS

* cited by examiner

Primary Examiner — Thomas Tarcza
Assistant Examiner — Nga X Nguyen
(74) Attorney, Agent, or Firm — Donna P. Suchy; Daniel M. Barbieri

(57) ABSTRACT

The present invention is a geolocation system for providing coordinated sensing and precision geolocation of a target emitter. The system may include a Quint Networking Technology (QNT) subsystem which may be configured receiving, detecting and identifying a target emitter signal. The QNT subsystem may be further configured for extracting a carrier phase of the signal. The system may further include a Real Time Kinematic Global Positioning System (RTK GPS) subsystem for determining a position of the geolocation system relative to a position of a second geolocation system. Further, the system may be configured for communicating with the second geolocation system via a QNT communication data link for: determining a QNT time difference via signal carrier phase differencing for calculating a time difference between the geolocation systems and geolocating the target emitter based on both the relative position information of the geolocation systems and the calculated time difference between the geolocation systems.

11 Claims, 5 Drawing Sheets

US 8,193,981 B1

COORDINATED SENSING AND PRECISION GEOLOCATION OF TARGET EMITTER

FIELD OF THE INVENTION

The present invention relates to the field of advanced sensors and particularly to a system and method for providing coordinated sensing and precision geolocation of a target emitter.

BACKGROUND OF THE INVENTION

A number of current systems/methods for providing sensing and geolocation of a target emitter may not provide a desired level of performance.

Thus, it would be desirable to provide a system/method for providing sensing and geolocation of a target emitter which obviates the problems associated with current solutions.

SUMMARY OF THE INVENTION

Accordingly, an embodiment of the present invention is directed to a geolocation system for providing coordinated sensing and precision geolocation of a target emitter, said system including: a Quint Networking Technology (QNT) subsystem, the QNT subsystem configured for receiving a signal emitted by the target emitter, the QNT subsystem further configured for detecting and identifying the signal, the QNT subsystem further configured for extracting a carrier phase of the signal; a Real Time Kinematic Global Positioning System (RTK GPS) subsystem, the RTK GPS subsystem configured for determining a position of the geolocation system relative to a position of a second geolocation system, wherein the geolocation system is configured for communicating with the second geolocation system via a QNT communication data link for: determining a QNT time difference via signal carrier phase differencing to calculate an instantaneous difference between local clocks of QNT subsystems in the first and second geolocation systems, configuring/re-configuring the RTK GPS subsystem to monitor variations in time difference between the QNT clocks after the calculation of the instantaneous difference/after the instantaneous calibration, and geolocating the target emitter based on both the relative position information of the geolocation systems, and the calculated time difference between the geolocation system clocks, and determining time difference of arrival (TDOA) via a carrier phase difference between measurements made by the geolocation system and the second geolocation system.

An additional embodiment of the present invention is directed to a method for precision geolocation of a target emitter, said method comprising: receiving a signal at a first receiver of a first geolocation system of a first aircraft, said signal being transmitted by the target emitter; detecting the signal, identifying the signal and extracting a carrier phase from the signal via Signals Intelligence (SIGINT) functions; determining a position of the first aircraft via Global Positioning System (GPS); communicating with a second receiver of a second geolocation system of a second aircraft via a Quint Networking Technology (QNT) communication data link; determining relative position information for the first aircraft with respect to the second aircraft via Real Time Kinematic (RTK) GPS; determining a QNT time difference, wherein said QNT time difference is determined via signal carrier phase differencing for the purpose of calculating an instantaneous time difference between the clocks of the two QNT receivers; dynamically updating the position information of the first aircraft via RTK GPS; dynamically updating the relative position information for the first aircraft with respect to the second aircraft based on the updated position information of the first aircraft; dynamically calculating an updated time difference between the first geolocation system and the second geolocation system based on reconfigured RTK GPS subsystem measurements; geolocating the target emitter based upon the relative position information, the updated relative position information, the QNT time difference, the updated QNT time difference, time difference of arrival (TDOA) of the target emitter signal, updated time difference of arrival (updated TDOA) of the target emitter signal.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Coordinated measurement of the time difference of arrival of a signal emitted by a target may be implemented for geolocating a position of the target. Further, a data link, such as the Quint Networking Technology (QNT) data link that utilizes proven Tactical Targeting Network Technology (TTNT) design concepts, may be utilized to facilitate said coordinated measurement by providing fast exchange of information between cooperative listeners whenever signals from said target are detected. However, when time difference of arrival principles are implemented (as mentioned above), the accuracy of target geolocation may depend greatly on the bandwidth of the emitted signal. For example, if the emitted signal is a narrowband (ex—25 kilohertz (kHz) or less) signal, large measurement errors may occur during said coordinated measurement process, thereby leading to significant geolocation errors. For instance, said geolocation errors may be on the order of hundreds of meters. The present invention provides a system and method for determining highly accurate geolocation, even for narrowband signal emissions.

Accurate geolocation of a target emitter may be accomplished by two geolocation systems which are in close cooperation with each other. To be in close cooperation with each other, the two geolocation systems will have already established sub-decimeter relative positioning and sub-nanosecond relative timing, or time difference, between them. Instantaneously, a closely-cooperating pair of geolocation systems may derive highly accurate directional bearing to the target. Over a period of time, as the pair of geolocation systems are flown/fly about, the directional bearing varies, such that the target's location may be resolved accurately/with greater accuracy. Alternatively, the target's location may be resolved in a near-instantaneous manner via a collaboration of multiple pairs of geolocation systems, or, by close cooperation of more than two geolocation systems that are well-distributed spatially for resolving the target's location in a nearly instantaneous manner. Collaboration between the two or more pairs of geolocation systems may include a loose exchange of accurate bearing information for determining the target's location. However, collaboration does not require sub-decimeter relative positioning and/or sub-nanosecond relative timing to be established. Still further, the target's location may be resolved nearly instantaneously by close cooperation of two or more geolocation systems which are widely distributed spatially.

Figure 1:
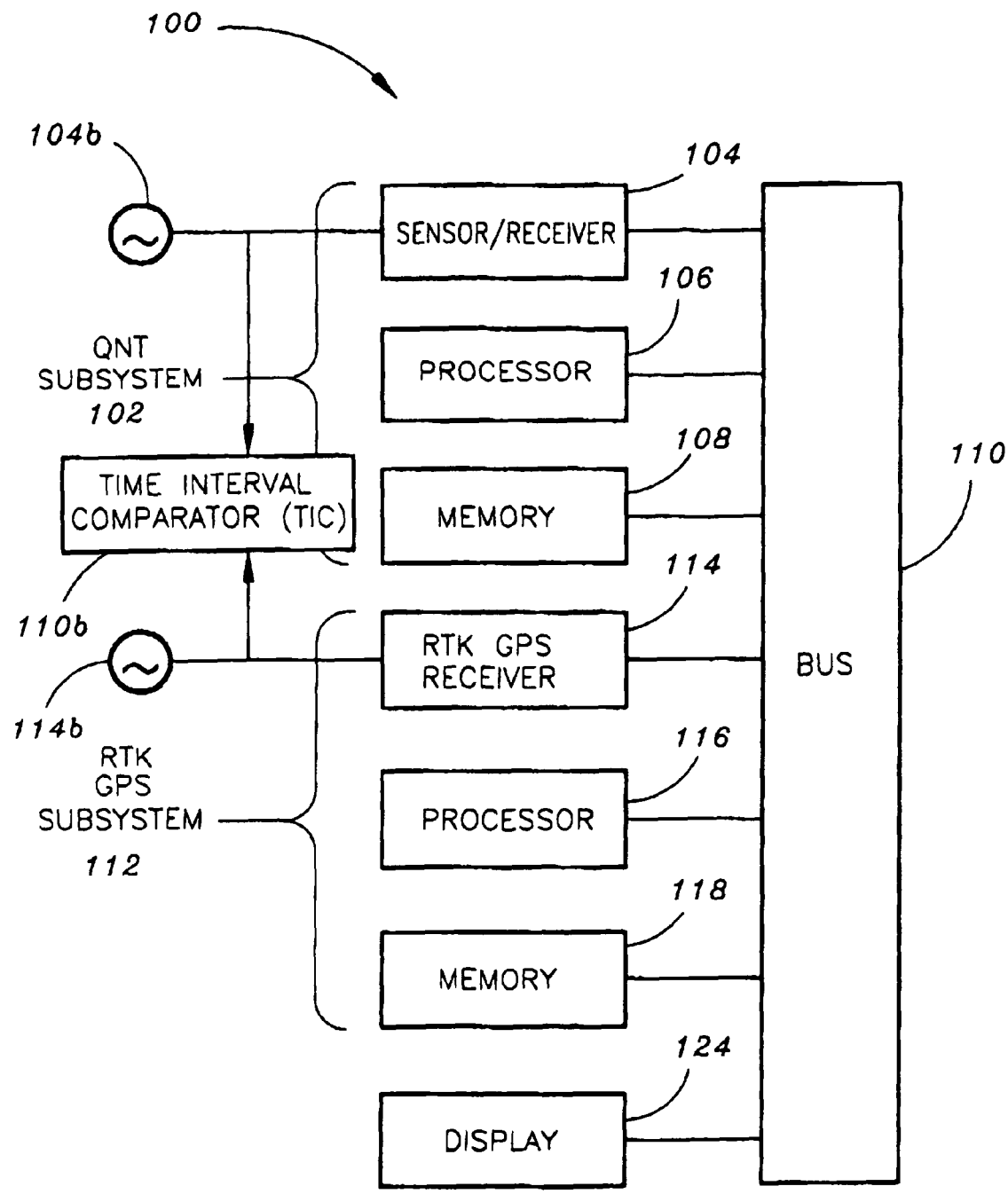
FIG. 1 is a block diagram schematic of a geolocation system in accordance with an exemplary embodiment of the present invention.

Referring generally to FIG. 1, a geolocation system for providing coordinated sensing and precision geolocation of a target/target emitter is shown. In the illustrated embodiment of the present invention, the geolocation system 100 includes a first subsystem 102. The first subsystem 102 may be a transceiver subsystem, such as a Quint Networking Technology (QNT) subsystem. In exemplary embodiments, the first subsystem/QNT subsystem 102 may include a receiver/transceiver/sensor 104, such as a phase coherent sampling, wideband transceiver. The receiver/transceiver/sensor 104 may be configured for receiving/sensing/detecting/identifying a signal which has been emitted by the target emitter. For instance, the receiver 104 may be capable of detecting the signal from a distance of greater than 25 miles away.

In current embodiments of the present invention, the receiver 104 may be a QNT radio/sensor. Further, the receiver 104 may be configured for extracting a carrier phase of the received signal. For example, the receiver 104 (ex.—a QNT radio) may be adapted for Signals Intelligence (SIGINT) functions and may be configured for detecting, identifying and/or extracting the carrier phase from the received signal via SIGINT methods and coordinating with other like receivers to compare data from their recorded time history to extract relevant measurements. In additional embodiments, the first subsystem/QNT subsystem 102 may include a processor 106 and a memory 108. The receiver 104, the processor 106 and the memory 108 of the first subsystem/QNT subsystem 102 may be communicatively coupled, such as via a bus 110, as illustrated in FIG. 1.

In exemplary embodiments of the present invention, the geolocation system 100 may further include a second subsystem 112. The second subsystem 112 may be a satellite-based navigation system subsystem (ex.—Global Positioning System (GPS), Global Navigation Satellite System (GLONASS), etc.). For example, the satellite-based navigation system subsystem may be a Global Positioning System (GPS) receiver subsystem that can support Real Time Kinematic Global Positioning System (RTK GPS) functionality. (RTK is an industry-accepted acronym for Real Time Kinematic, where the methodology applies even if the implementation does not strictly produce a real-time solution). In further embodiments, the second subsystem/the RTK GPS subsystem 112 may include an RTK GPS receiver/transceiver/sensor 114. The RTK GPS subsystem 112 may further include a processor 116 and a memory 118. The receiver 114, the processor 116 and the memory 118 of the second subsystem/RTK GPS subsystem 112 may be communicatively coupled, such as via a bus 110, as illustrated in FIG. 1. Further, the RTK GPS subsystem 112 may be communicatively coupled with the QNT subsystem 102, such as via a bus 110 for data exchange, and may be synchronized with the QNT subsystem 102 via a Time Interval Comparator (TIC) 110b, as illustrated in FIG. 1. The TIC 110b is a high-resolution clocked hardware device which measures a time difference between the referencing timing in two independently-clocked subsystems. In a present embodiment, the TIC 110b measures a time difference between the QNT subsystem 102 and the RTK GPS subsystem 112 of the geolocation system 100 to maintain synchronization. The QNT receiver 104 is clocked by a reference oscillator 104b, while the RTK GPS receiver 114 is clocked by reference oscillator 114b.

In additional embodiments of the present invention, the RTK GPS subsystem 112 may be configured for determining a relative position of the geolocation system 100 (ex.—a position/location of the receiver 104) with respect to a second geolocation system 120 (absolute position of the geolocation system 100 is determined as a by-product from the GPS). In additional embodiments of the present invention, the RTK GPS subsystem 112 may also be reconfigured for determining variation of a relative time between the two geolocation systems 100, 120 (ex.—for determining a change in relative time over time, but not the actual relative time at a given instant). This is accomplished using GPS carrier phase signal differences (between the two geolocation systems) that contain a relative time term after subtracting out the relative position term obtained from the RTK GPS solution. Further, keeping track of relative GPS time may be equivalent to doing so for relative QNT time because the TIC function, 110b, establishes an accurate relationship between the GPS and QNT clock times in each geolocation system. In alternative embodiments, one or more various satellite-based navigation systems (other than RTK GPS) may be implemented. A display/indicator device 124 may be included in/communicatively coupled to the geolocation system 100 for providing an indication, such as a visual indication and/or audible indication which may indicate a geolocated position of the target.

Figure 2:
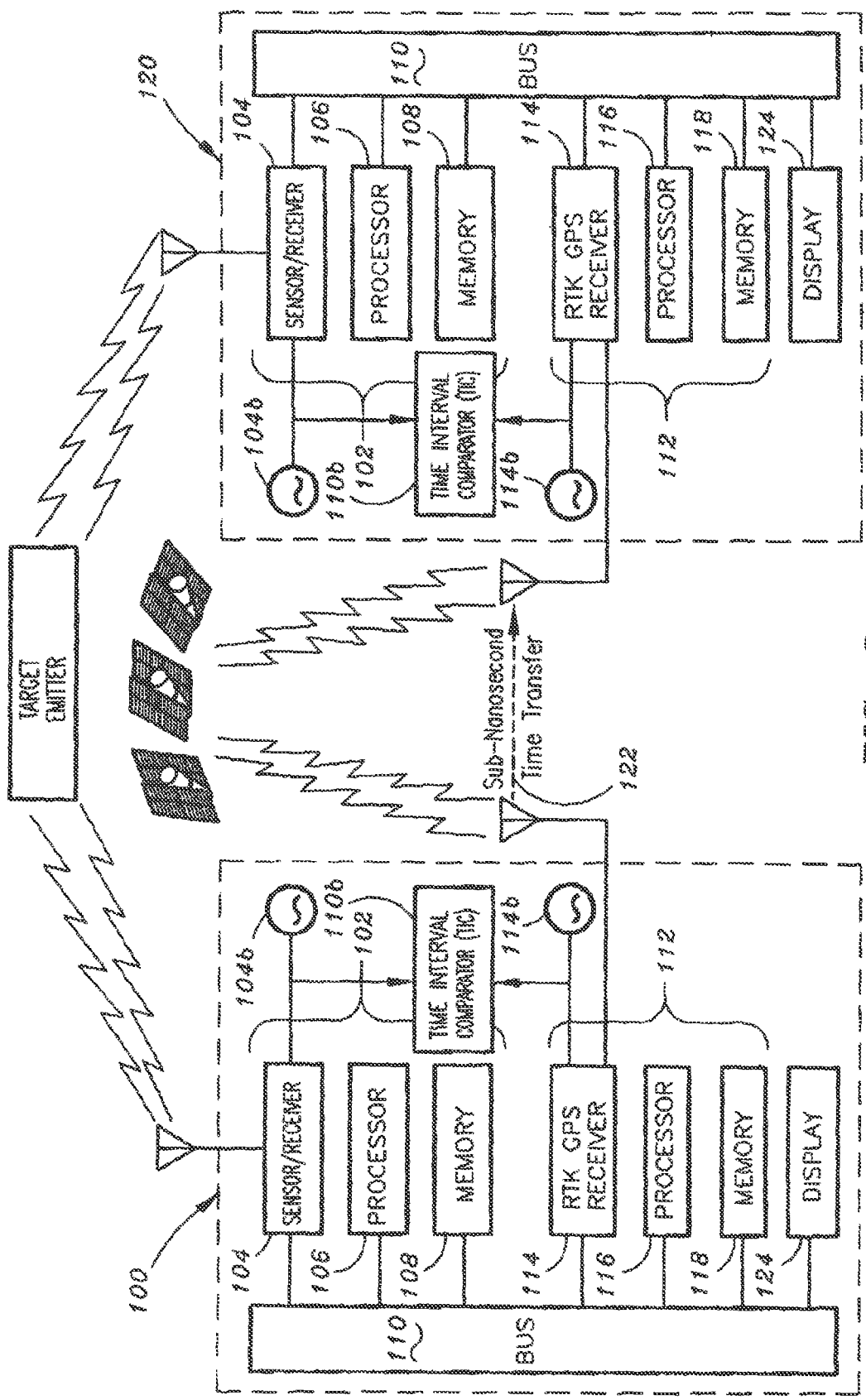
FIG. 2 is a communication schematic illustrating communication between the geolocation system of the present invention and a second geolocation system, by which said geolocation systems may resolve cycle ambiguities and provide sub-nanosecond time transfer between said systems in accordance with an exemplary embodiment of the present invention.
Figure 4:
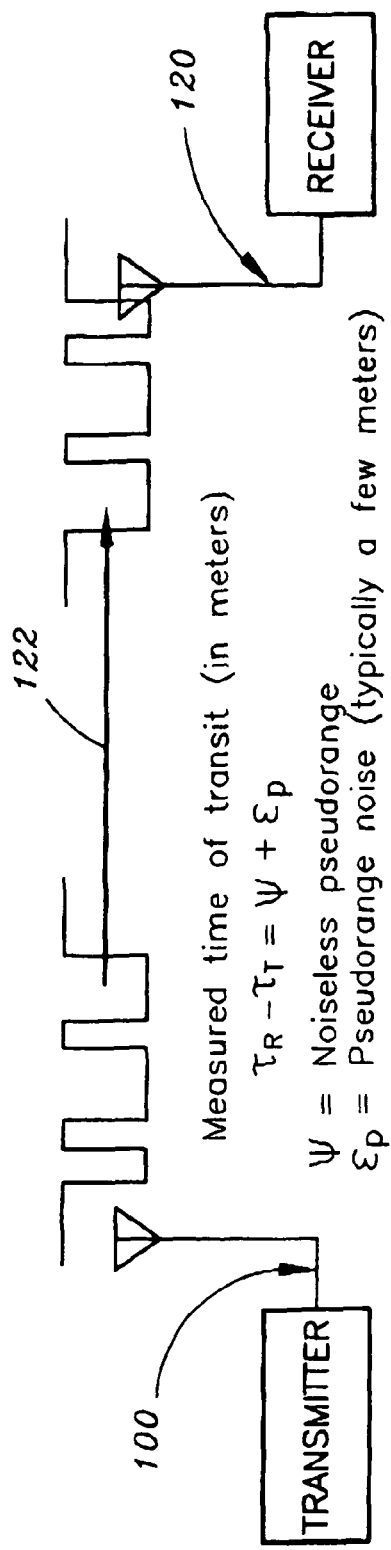
FIG. 4 is a communication schematic illustrating communication between a first (ex.—transmitting) geolocation system and a second (ex.—receiving) geolocation system in accordance with an exemplary embodiment of the present invention.
Figure 5:
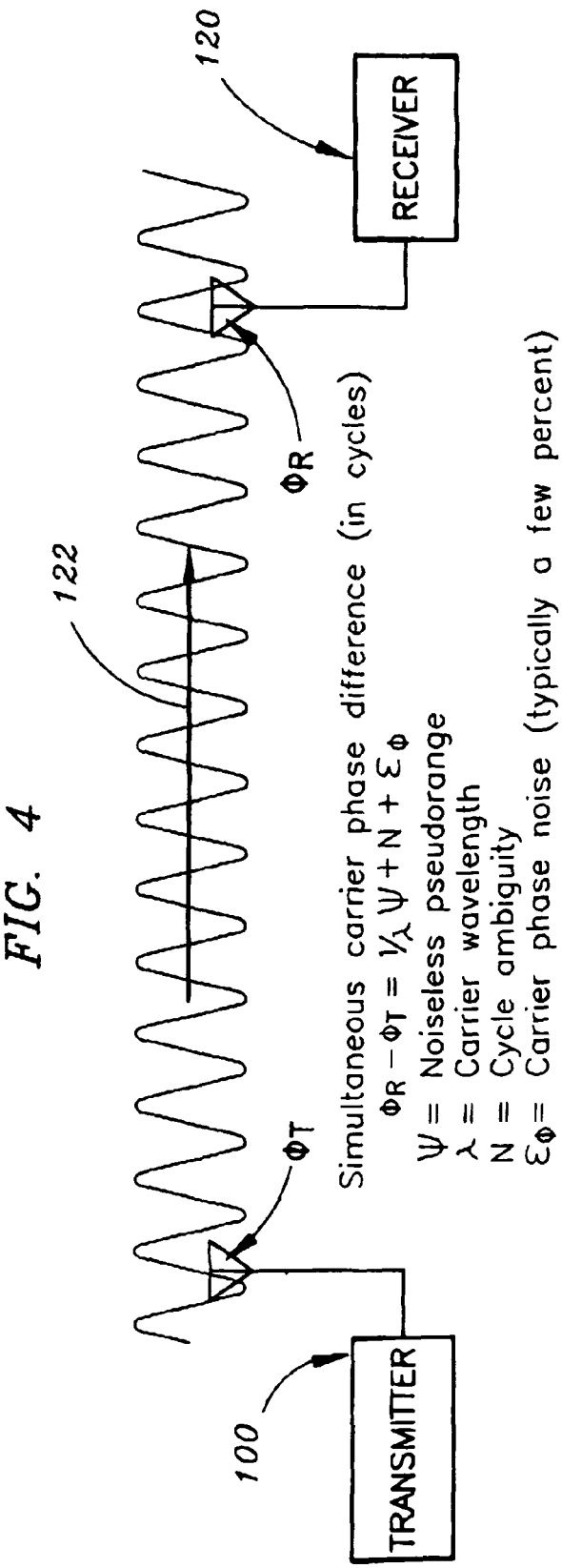
FIG. 5 is a communication schematic illustrating communication between a first (ex.—transmitting) geolocation system and a second (ex.—receiving) geolocation system in accordance with a further exemplary embodiment of the present invention.

In current embodiments of the present invention, the geolocation system 100 may be configured for communication with a second geolocation system 120 via a communication link/communication data link 122, as shown in FIGS. 2, 4 and 5. For example, the communication link 122 may be a QNT communication data link which allows communication between the QNT receiver 104 of the first geolocation system 100 and a QNT receiver of the second geolocation system 120. In exemplary embodiments, the first geolocation system 100/first QNT receiver 104 may be configured for being installed in/on-board a first aircraft, while the second geolocation system 120/second QNT receiver may be configured for being installed in/on-board a second aircraft. In additional embodiments, the second geolocation system 120 may be constructed and may function similarly to/identical to the first geolocation system 100 described above. For instance, the second geolocation system 120 may have one or more of the same components (ex.—QNT receiver, RTK GPS receiver, etc.) as the first geolocation system 100.

In exemplary embodiments of the present invention, the first geolocation system 100 may be configured for coordinating with the second geolocation system 120 via the communication link 122 to establish relative positions of the first aircraft (ex.—first geolocation system 100/first QNT receiver 104) and the second aircraft (ex.—second geolocation system 120/second QNT receiver) with respect to each other. For example, in the present invention, the RTK GPS subsystem 112 of the first geolocation system 100 and an RTK GPS subsystem of the second geolocation system 120 may allow/may provide information such that the first geolocation system 100/first QNT receiver 104 and the second geolocation system 120/second QNT receiver may coordinate/work together to provide sub-decimeter relative position data/information/measurements for the first aircraft and the second aircraft. Further, in the present invention, the RTK GPS subsystem 112 of the first geolocation system 100 may and an RTK GPS subsystem of the second geolocation system 120 may be configured to allow/may provide information such that the first geolocation system 100/first QNT receiver 104 and the second geolocation system 120/second QNT receiver may coordinate/work together to provide/determine variation in relative time data/information/measurements for the first aircraft and the second aircraft.

In current embodiments of the present invention, the first geolocation system 100/first QNT receiver 104 may be configured for coordinating with the second geolocation system 120/second QNT receiver via the communication link 122 for establishing relative time between the first aircraft (ex.—first geolocation system 100/first QNT receiver 104) and the second aircraft (ex.—second geolocation system 120/second QNT receiver). For instance, the first geolocation system 100 and the second geolocation system 120 may be configured for measuring the relative time between the two geolocation systems (100, 120). In exemplary embodiments of the present invention, the first geolocation system 100/first QNT receiver 104 and the second geolocation system 120/second QNT receiver may be configured for calculating/determining/coordinating to provide a measurement of the time differencing/time difference of the signal via carrier phase differencing (ex.—via implementation of interferometric principles/carrier phase differencing principles) to determine relative time between the two geolocation systems 100, 120.

In exemplary embodiments, ranging measurements made via the communication link 122 (ex.—QNT communication data link, TTNT data link) may provide/allow for Inter-Aircraft sub-nanosecond time transfer for synchronizing the QNT receivers/geolocation systems (100, 120) of the first aircraft and the second aircraft. This is advantageous compared to having time transfer depend upon differential code phase GPS, which would yield an accuracy of several nanoseconds. In the present invention, QNT low-band mode may be programmed to generate signals of any waveform modulation and any frequency in the UHF band where timing may be based on carrier phase (the sub-nanosecond time transfer process is described above).

This communication signal contains a wideband waveform modulation that allows for a transit time measurement to be made between point of transmission and point of receipt. In said communication signal, the waveform may be modulated onto a carrier signal of a first frequency whose phase prior to modulation is known in the transmitting geolocation system as well as after demodulation in the receiving geolocation system. A carrier phase difference is formed from phase measurements made simultaneously at the transmitting and receiving geolocation systems at scheduled epochs, such as at 10 Hz. Following the above-referenced measurement process at the first frequency, the same signal may be transmitted and received at a second carrier frequency and the same measurements of transit time based on the wideband waveform modulation and the carrier phase difference are made. Measurements which follow at a third or subsequent carrier frequency may be made to add robustness to the ultimate/final time difference solution. Said measurement process may resume with revisiting the other previously selected frequencies on a programmed basis until a time difference solution is arrived at by the complete resolution of the integer ambiguities associated with the carrier phases.

The processing of the time difference solution may be carried out in the first geolocation system or the second geolocation system or in both of them. At each processing cycle, a measurement vector is formed, the measurement vector is preprocessed, and the preprocessed measurement vector is fed to a Kalman filter. The measurement vector consists of: 1) A time of transit measurement made from the wideband waveform modulation of the QNT signal (expressed as a pseudorange in meters); 2) A difference in the carrier phases measured at the transmitter and the receiver at simultaneous sampling times (expressed in wavelengths of the known carrier frequency). The preprocessing of the measurement vector is intended to extract known dynamics of the relative position and of the relative time between the two geolocation systems. The dynamics of the relative position information are obtained from the RTK GPS subsystem 112 configured for conventional RTK, and the dynamics of the relative time information are obtained from the subsystem 112 reconfigured for determining variation of the relative time. The Kalman filter sequentially assimilates the preprocessed measurement vectors to estimate a bias state that represents a time difference bias, as well as estimate the cycle ambiguities associated with each of the carrier frequencies involved. For example, there will be three states dedicated to ambiguities if three different carrier frequencies are used in the time transfer process. This Kalman filter is designed to collect the measurement information but cannot, by itself, resolve the ambiguities and provide an accurate estimate of the time difference. Rather, the state vector and error covariance matrix of the Kalman filter feeds a secondary process that imposes an integer constraint on the ambiguity states and conducts a search of various combinations of integer ambiguities in the manner of multiple hypothesis testing. Within the search space, a probability measure is computed for each hypothesis that consists of a combination of integers. The correct set of integers is identified when its associated probability measure approaches very close to 1. The time difference estimate that is associated with this correct set of integers is then declared as the valid time difference solution. When this initial process has been completed, the time difference solution is recombined with information obtained from the subsystem 112 reconfigured for determining variation of the relative time to provide the current optimal estimate of relative time/time difference between the two geolocation systems. The accuracy of this estimate is at the sub-nanosecond level.

Further, in exemplary embodiments, after relative position and relative time between the first geolocation system 100 and the second geolocation system 120 have been accurately established, the two geolocation systems may be configured for geolocating the target/target emitter with/via calculated time difference of arrival (TDOA) between the two geolocation systems based on the above-referenced coordinated measurements (by the geolocation systems 100, 120) of the carrier phase difference of the target signal. This TDOA may be uniquely established once the integer cycle ambiguities associated with the carrier phase difference measurements are resolved.

In an exemplary scenario, the first aircraft and the second aircraft may be flying in loose formation toward the target/target emitter. Further, the signal emitted by the target emitter may be received by: the first aircraft/the QNT receiver 104 of the first geolocation system 100; and the second aircraft/the QNT receiver of the second geolocation system. For example, the received signal may be a Very High Frequency (VHF) signal, an Ultra High Frequency (UHF) signal and/or a signal having narrowband modulation (ex.—a signal having a bandwidth of 25 kilohertz (kHz) or less). Further, the received signal may have a short transmission burst which is continuous within a Time Division Multiple Access (TDMA) window in the order of several milliseconds. Still further, the time of transmission of the received signal may be unknown.

TDOA measurement of the signal from the target emitter calculated by the geolocation systems 100, 120/QNT receivers may be utilized by said systems 100, 120 to determine a directional bearing of transmission of the signal (ex.—in a two-dimensional (2-D) problem). In exemplary embodiments of the present invention, the geolocation systems 100, 120 may be configured for determining (ex.—dynamically determining/dynamically updating) TDOA measurements over time over changing geometry (ex.—said relative position measurements also being dynamically determined, updated) to promote geolocation of the target (ex.—to instantaneously establish/locate a two-dimensional (2-D) position of the target). Target location may also be obtained via two TDOA measurements taken simultaneously by three aircraft. When treated as a 2-D problem, the target height (above a reference surface) is employed to complete the target geolocation model. In another exemplary embodiment, the target geolocation model may be treated fully as a 3-D problem to be solved by the same TDOA measurements.

Determining TDOA via carrier phase differencing, as in the present invention, may provide greater/higher/better geolocation accuracy than those systems which measure TDOA via cross-correlation of signal modulation/implementation of time difference of arrival principles, particularly when the signal is a narrow bandwidth signal. For instance, when implementing time difference of arrival principles to determine TDOA for a signal having a bandwidth of 25 kilohertz (25 kHz) and a wavelength of 12 kilometers, geolocation measurement error may be in the order of 100 meters (even if relative position is established in the order of 10's of meters). Contrastingly, in exemplary embodiments of the present invention, determining TDOA via carrier phase differencing may allow the geolocation systems 100, 120 to geolocate the target/target emitter with accuracy in the order of less than one meter. (ex.—if the signal is a VHF signal having a 10 meter wavelength or if the signal is a UHF signal having a 1 meter wavelength). However, determining TDOA via carrier phase differencing may introduce an unknown (ex.—cycle ambiguities/integer cycle ambiguities) since carrier phase (and not code phase) is implemented.

In current embodiments of the present invention, the geolocation systems 100, 120/QNT receivers, via implementation of the RTK GPS subsystem(s) 112, may be configured for solving cycle ambiguity/target signal cycle ambiguity over time when a relative baseline motion between the first and second aircrafts is known. It is the changing baseline and the nearly full knowledge of this dynamic baseline that affords a Kalman filter the ability to estimate the cycle ambiguity and consequently the TDOA of the signal from the target emitter. The RTK GPS subsystem(s) 112 may provide information/data which may allow for determination as to how the baseline between the first aircraft and the second aircraft is changing over time. Continuity of the signal over a duration of observation by the system(s) 100, 120 may be important, so an amount of inter-aircraft baseline motion may be necessary over said duration (ex.—a few milliseconds). If said duration of observation is inadequate for said systems 100, 120/QNT receivers to provide the above-referenced geolocation functionality to a desired level of accuracy/to allow said systems 100, 120 to resolve said cycle ambiguities, multiple TDMA windows may be patched together via various interpolation/smoothing methods in order to resolve said ambiguities.

Figure 3:
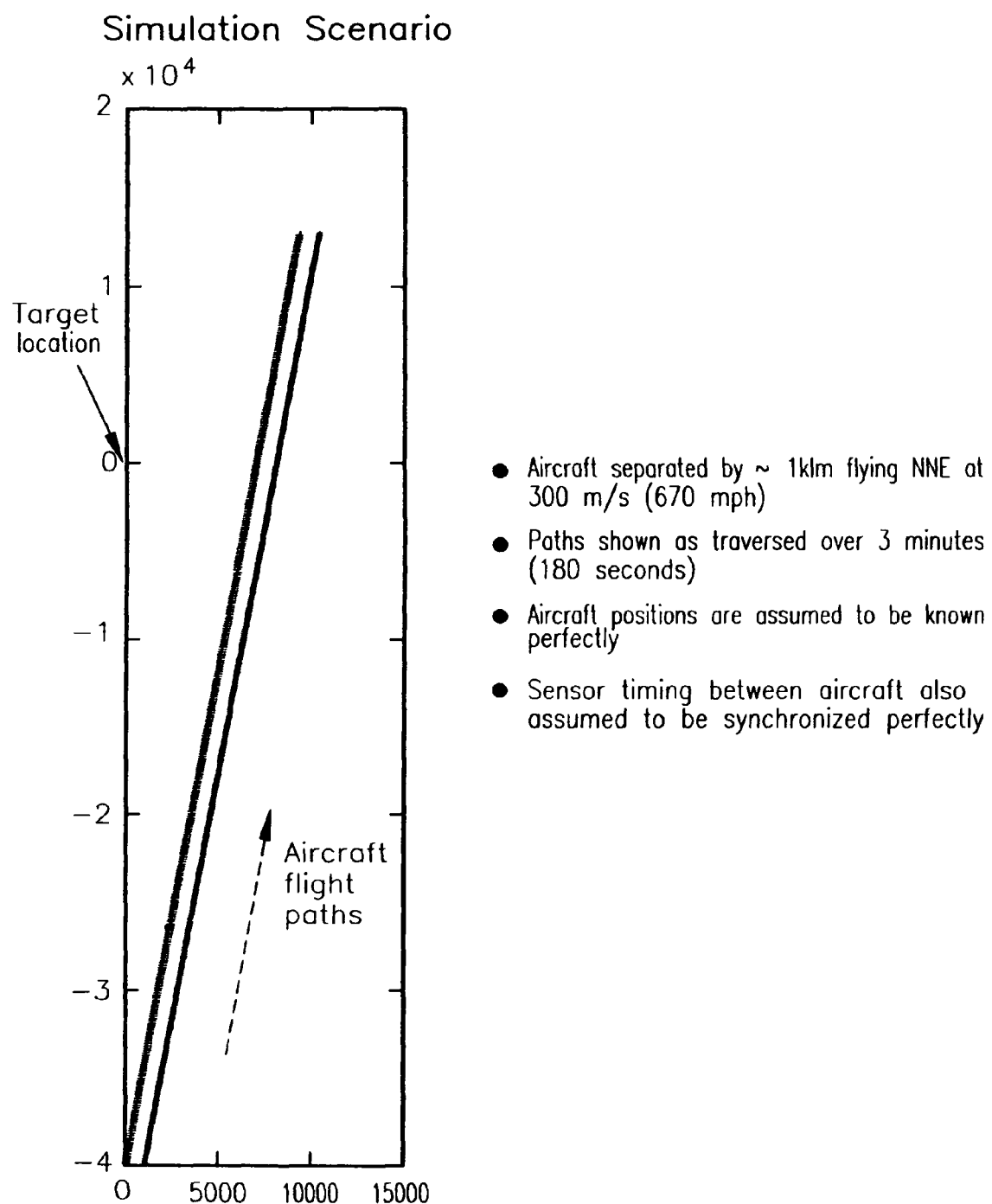
FIG. 3 is a graphical depiction of a simulation scenario for a first aircraft and a second aircraft implementing geolocation systems in accordance with an exemplary embodiment of the present invention.

As shown in FIG. 3, the two parallel flight paths flying slightly by target are enough to introduce a changing inter-aircraft baseline with respect to the target such that the cycle ambiguities would be resolved somewhat quickly. The simulated scenario in FIG. 3 involves a pair of aircraft which are separated by approximately 1 kilometer and are flying North-Northeast (NNE) at three hundred meters/second (670 miles per hour). Further, the aircraft flight paths are shown as being traversed over 3 minutes/180 seconds and are assumed to be known perfectly by said systems 100, 120. In the illustrated situation, the Kalman filter also converges on the target location as the aircraft pair flies closer to/by the target. Further, said sensor timing between the QNT receivers/systems 100, 120 may be assumed to be synchronized by the QNT time transfer described earlier.

As mentioned above, the geolocation systems 100, 120/QNT receivers of the present invention may be configured for geolocation/determining a position of the target (ex.—determining x and y coordinates of the target), while also resolving (ex.—while simultaneously resolving) cycle ambiguity error based on known baseline motion of the aircrafts.

Figure 6:
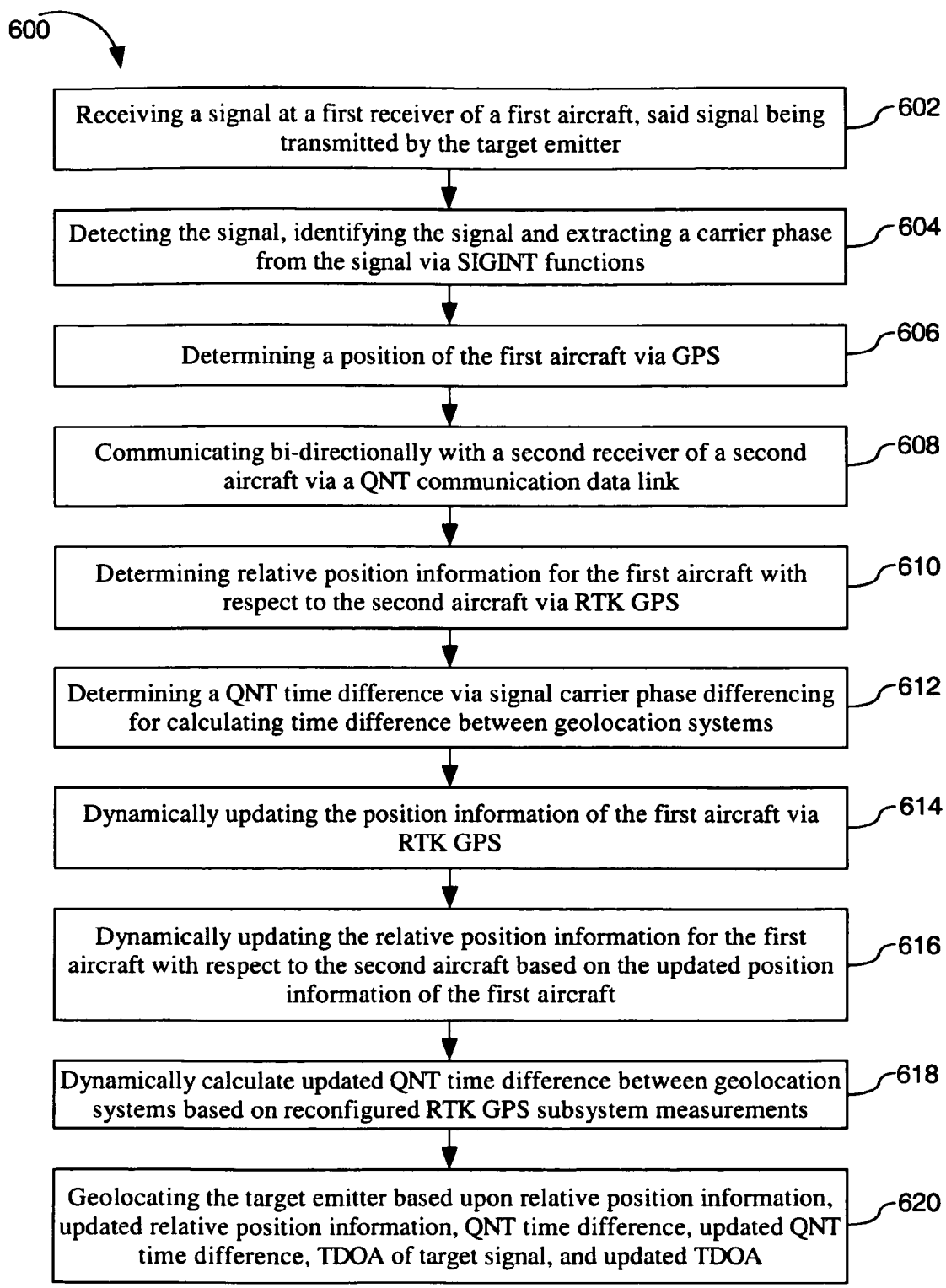
FIG. 6 is a flowchart illustrating a method for precision geolocation of a target emitter in accordance with an exemplary embodiment of the present invention.

Referring to FIG. 6, a flow chart illustrating a method for precision geolocation of a target emitter in accordance with an exemplary embodiment of the present invention is shown. In a current embodiment of the present invention, the method 600 may include the step of receiving a signal at a first receiver (ex.—QNT receiver) of a first aircraft, said signal being transmitted by the target emitter 602. The method 600 may further include detecting the signal, identifying the signal and extracting a carrier phase from the signal via Signals Intelligence (SIGINT) functions 604. The method 600 may further include determining a position of the first aircraft via Real Time Kinematic Global Positioning System (RTK GPS) 606. The method 600 may further include communicating with a second receiver (ex.—QNT receiver) of a second aircraft via a Quint Networking Technology (QNT) communication data link 608.

In exemplary embodiments, the method 600 may further include determining relative position information for the first aircraft with respect to the second aircraft 610. The method 600 may further include determining a QNT time difference 612. In current embodiments of the present invention, the QNT time difference may be determined via signal carrier phase differencing. In additional embodiments, the method 600 may further include dynamically updating the position information of the first aircraft via Real Time Kinematic Global Positioning System (RTK GPS) 614. The method 600 may further include dynamically updating the relative position information for the first aircraft with respect to the second aircraft based on the updated position information of the first aircraft 616. The method 600 may further include calculating an updated QNT time difference 618. The method 600 may further include geolocating the target emitter based upon the relative position information, the updated relative position information, the QNT time difference, an updated time difference between geolocation systems based on reconfigured RTK subsystem, the TDOA of the signal from the target emitter, and the updated TDOA 620 of the signal from the target emitter.

As mentioned above, the geolocation systems 100, 120 of the present invention may be configured to solve time transfer cycle ambiguity problems and to provide sub-nanosecond time transfer between the QNT receiver 104 of the first geolocation system 100 and the QNT receiver of the second geolocation system 120. Further, target signal cycle ambiguity may be resolved by the geolocation systems 100, 120 of the present invention via accurately known relative position information for the aircrafts and a continuity of information on/about the target signal. Discontinuities in the target signal from TDMA bursts may be overcome by bridging successive signal bursts. In additional embodiments, accurate geolocation of the target by the geolocation systems 100, 120 may depend on change in geometry conditions based on operational constraints in aircraft flight profile. The present invention allows for ambiguities associated with VHF or UHF narrowband signals in a phase differencing scheme to be resolved over a brief period of time and for emitter location to be determined very accurately (ex.—to the order of a few meters) with adequate measurement geometry. The above-described technique of geolocating the target emitter may be performed following detection and identification of the target emitter signal. As mentioned above, SIGINT methods may be implemented by the geolocation system 100 of the present invention for detecting the signal, identifying the signal, and extracting the carrier phase from the signal. Proper coordination of data history sensed between the cooperating geolocation systems 100, 120/the first and second aircraft when a target emitter signal has been detected may be greatly facilitated by the low-latency attributes of the QNT receiver 104/QNT radio/SIGINT sensor.

It is understood that the specific order or hierarchy of steps in the foregoing disclosed methods are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is to be noted that the foregoing described embodiments according to the present invention may be conveniently implemented using conventional general purpose digital computers programmed according to the teachings of the present specification, as will be apparent to those skilled in the computer art. Appropriate software coding may readily be prepared by skilled programmers based on the teachings of the present disclosure, as will be apparent to those skilled in the software art.

It is to be understood that the present invention may be conveniently implemented in forms of a software package. Such a software package may be a computer program product which employs a computer-readable storage medium including stored computer code which is used to program a computer to perform the disclosed function and process of the present invention. The computer-readable medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A geolocation system for providing coordinated sensing and precision geolocation of a target emitter, said system comprising:
    a transceiver subsystem, the transceiver subsystem configured for receiving a signal emitted by the target emitter, the signal being one of: a Very High Frequency (VHF) narrowband signal and an Ultra High Frequency (UHF) narrowband signal, the transceiver subsystem further configured for detecting and identifying the signal, the transceiver subsystem further configured for extracting a carrier phase of the signal;
    a satellite-based navigation system subsystem, the satellite-based navigation system subsystem configured for determining a position of the geolocation system relative to a position of a second geolocation system, the satellite-based navigation system subsystem being a Real Time Kinematic Global Positioning System (RTK GPS) subsystem;
    wherein the geolocation system communicates with the second geolocation system via a communication data link for: determining a communication signal time delay via signal carrier phase differencing for calculating a time difference between clocks of the first geolocation system and the second geolocation system and for configuring said satellite-based navigation system subsystem for monitoring subsequent variations in said time difference and geolocating the target emitter based on both the relative position information of the geolocation systems and the calculated time difference, and determining time difference of arrival (TDOA) via a carrier phase difference between measurements made by the geolocation system and the second geolocation system.

2. A geolocation system as claimed in claim 1, wherein the carrier phase is extracted via Signals Intelligence (SIGINT) methods.

3. A geolocation system as claimed in claim 1, wherein the geolocation system is configured for implementation on-board an aircraft.

4. A geolocation system as claimed in claim 1, wherein the system is configured for attaining sub-nanosecond time transfer synchronization with the second geolocation system via the communication link.

5. A geolocation system as claimed in claim 1, wherein the relative position information is determined to a sub-decimeter accuracy.

6. A geolocation system as claimed in claim 1, wherein bandwidth of the signal is less than 25 kilohertz (kHz).

7. A geolocation system as claimed in claim 1, wherein the transceiver subsystem is a Quint Networking Technology (QNT) subsystem.

8. A geolocation system as claimed in claim 1, wherein the communication data link is a Quint Networking Technology (QNT) communication data link.

9. A geolocation system as claimed in claim 1, wherein the communication signal time delay is a Quint Networking Technology (QNT) communication signal time delay.

10. A method for precision geolocation of a target emitter, comprising:
- receiving a signal at a first receiver of a first geolocation system of a first aircraft, said signal being transmitted by the target emitter;
- detecting the signal, identifying the signal and extracting a carrier phase from the signal;
- determining a position of the first aircraft via Global Positioning System (GPS);
- communicating with a second receiver of a second geolocation system of a second aircraft via a communication data link;
- determining relative position information for the first aircraft with respect to the second aircraft via Real Time Kinematic Global Positioning System (RTK GPS);
- determining a time difference between the first geolocation system and the second geolocation system via signal carrier phase differencing;
- dynamically updating the position information of the first aircraft via RTK GPS;
- dynamically updating the relative position information for the first aircraft with respect to the second aircraft based on the updated position information of the first aircraft;
- calculating an updated time difference between the first geolocation system and the second geolocation system via GPS carrier phase signal difference measurements; and
- geolocating the target emitter based upon the relative position information, the updated relative position information, the time difference, the updated time difference, time difference of arrival (TDOA) of the target emitter signal and updated time difference of arrival (updated TDOA) of the target emitter signal.

11. A geolocation system for providing coordinated sensing and precision geolocation of a target emitter, said system comprising:
- means for receiving a signal at a first receiver of a first geolocation system of a first aircraft, said signal being transmitted by the target emitter;
- means for detecting the signal, identifying the signal and extracting a carrier phase from the signal;
- means for determining a position of the first aircraft;
- means for communicating with a second receiver of a second geolocation system of a second aircraft;
- means for determining and dynamically updating relative position information for the first aircraft with respect to the second aircraft;
- means for determining and dynamically updating a time difference between clocks of the first geolocation system and the second geolocation system via signal carrier phase differencing; and
- means for geolocating the target emitter based upon the relative position information for the aircrafts and the time difference,
- wherein the signal is one of: a Very High Frequency (VHF) narrowband signal and an Ultra High Frequency (UHF) narrowband signal.

* * * * *